United States Patent
Sugamura (10) Patent No.: US 6,663,198 B2
(45) Date of Patent: Dec. 16, 2003

(54) TELEVISION CABINET

(75) Inventor: Tomokazu Sugamura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 43 days.

(21) Appl. No.: 09/880,716

(22) Filed: Jun. 12, 2001

(65) Prior Publication Data

US 2002/0024619 A1 Feb. 28, 2002

(30) Foreign Application Priority Data

Jun. 13, 2000 (JP) .................................... 2000-004082
May 28, 2001 (JP) .................................... 2001-003364

(51) Int. Cl.[7] .............................................. A47B 81/06
(52) U.S. Cl. ...................................................... 312/7.2
(58) Field of Search ........................... 312/7.2, 223.1, 312/223.2; 348/825, 836; 361/681, 682; 248/917, 918

(56) References Cited

U.S. PATENT DOCUMENTS

| | | | | |
|---|---|---|---|---|
| 5,033,802 A | * | 7/1991 | Fairbanks | 348/836 X |
| 5,526,064 A | * | 6/1996 | Okugawa et al. | 348/818 |
| 5,699,132 A | * | 12/1997 | Adachi et al. | 312/7.2 X |
| 5,956,101 A | * | 9/1999 | Yang | 312/7.2 X |
| 5,999,233 A | * | 12/1999 | Park | 312/7.2 X |
| 6,166,783 A | * | 12/2000 | Ahn | 312/7.2 X |
| 6,233,026 B1 | * | 5/2001 | Kim et al. | 348/836 |

FOREIGN PATENT DOCUMENTS

| | | |
|---|---|---|
| JP | 62-201583 | 12/1987 |
| JP | 63-72978 | 5/1988 |
| JP | 63-81474 | 5/1988 |
| JP | 8-336856 | 12/1996 |
| JP | 2000-101952 | * 4/2000 |

OTHER PUBLICATIONS

Patent Abstracts of Japan, publication No. 08–336856, dated Dec. 24, 1996.

* cited by examiner

Primary Examiner—James O. Hansen
(74) Attorney, Agent, or Firm—Rosenthal & Osha L.L.P.

(57) ABSTRACT

A platelike rib (7) molded integrally with a front cabinet is linked via the leg pieces (61) with the boss (5). The rib (7) has a high strength portion (73) of increased thickness extending lengthways to be continuous to a rear end portion of the boss (5). A link portion of the rib (7) with an outer board (11) is formed over an entire length in smaller thickness than the high strength portion (73). The surface of the high strength portion (73) at a front end portion is formed like a concave curved face 75).

9 Claims, 9 Drawing Sheets

TELEVISION CABINET

BACKGROUND OF THE INVENTION

1. Technical Field

The present invention relates to a television cabinet, and more particularly to a television cabinet of a structure which is divided into a front cabinet and a rear cabinet.

2. Related Art

In a television cabinet of this kind, for example, if a front cabinet and a rear cabinet are aligned, a bore portion of a boss provided on the front cabinet side is coincident with a vis insertion hole provided on the rear cabinet side, and if an attaching vis inserted from the back side into the vis insertion hole of the rear cabinet is screwed into the bore portion of the boss for the front cabinet and fastened, the front cabinet and the rear cabinet can be joined integrally via the attaching vis. The term "vis" as used in the present specification means fastening screw. One example of the front cabinet in such television cabinet is shown in FIG. 4.

Figure 4:
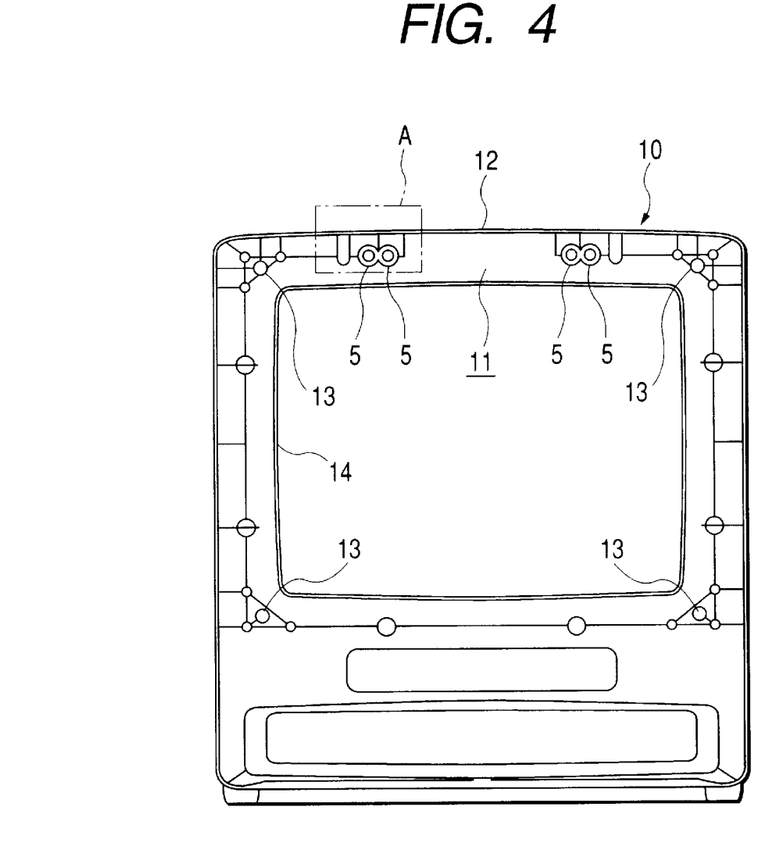
FIG. 4 is a rear view of a front cabinet as looked from the rear side.

FIG. 4 is a rear view of the front cabinet for use with the television cabinet of video integral type, as looked from the back side. As seen in the same figure, this front cabinet is provided with the boss 5 inside an upper board portion 12 of the outer board, the attaching vis being screwed into this boss 5. Reference numeral 13 denotes a cathode ray tube attaching boss, and reference numeral 14 denotes an opening in which a front face of the cathode ray tube is disposed.

Figure 5:
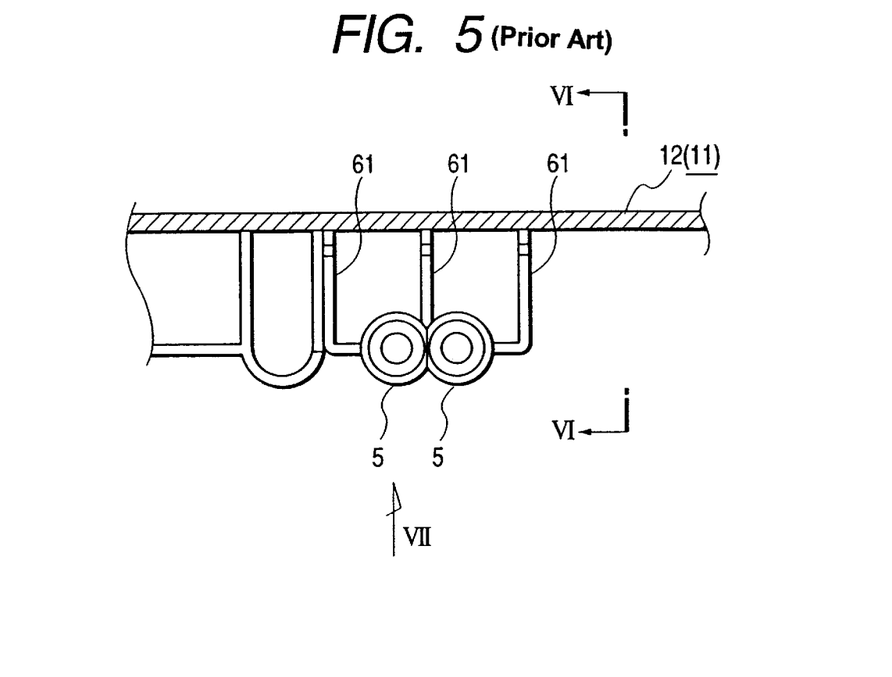
FIG. 5 is a front view of a boss formation portion in the conventional cabinet.
Figure 6:
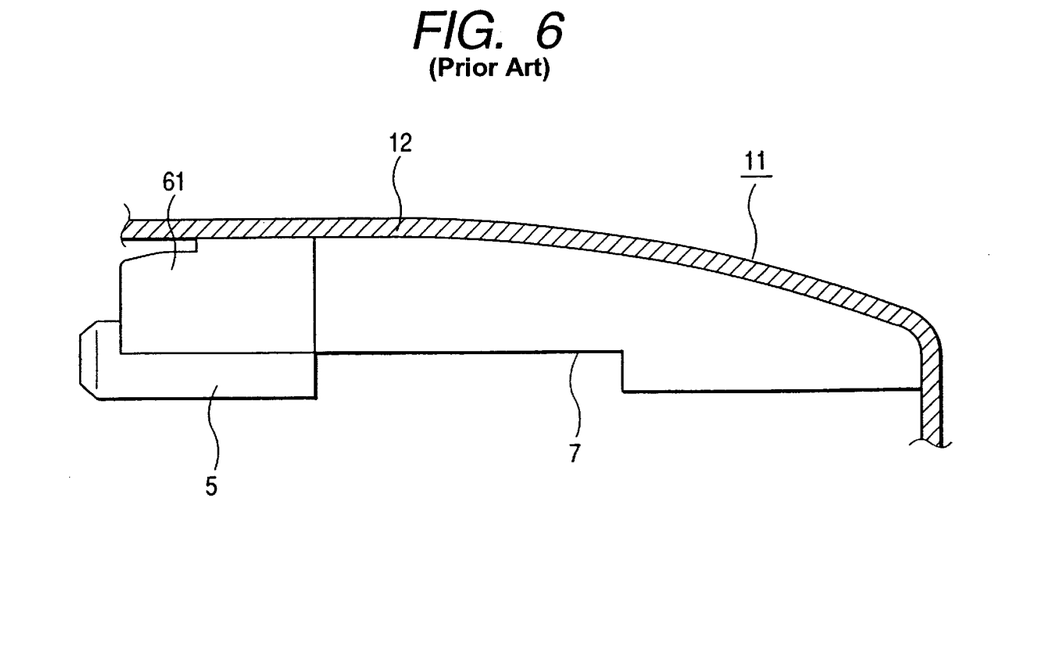
FIG. 6 is a cross-sectional view of FIG. 5, taken along the line VI—VI.
Figure 7:
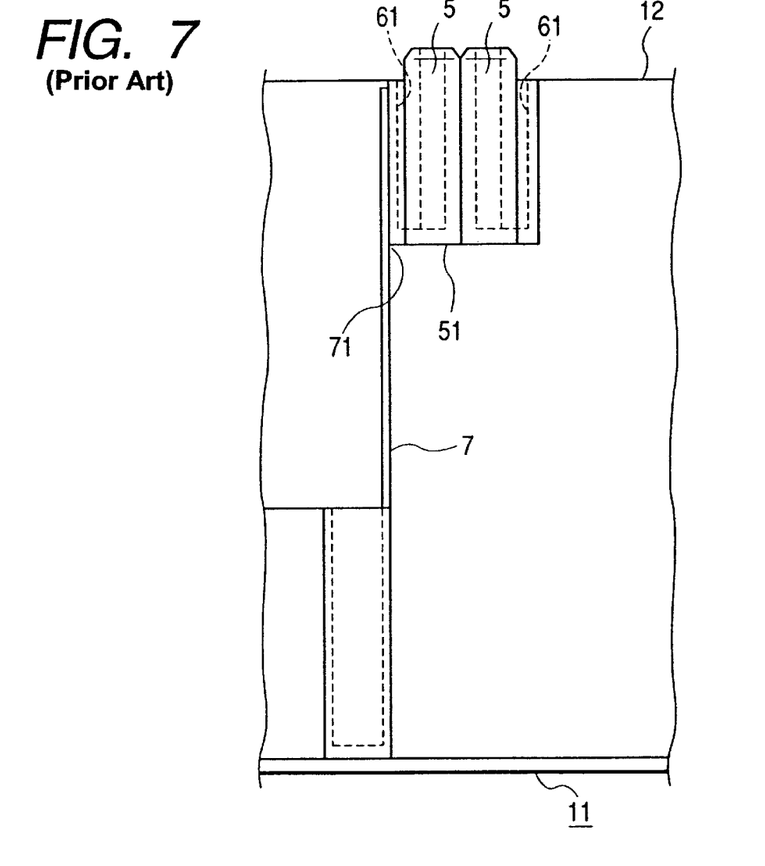
FIG. 7 is a perspective view of FIG. 5, as looked along the arrow VII.

FIGS. 5 to 7 show the conventional structure of a formation portion A of the boss 5 as shown in FIG. 4. FIG. 5 is a front view of the boss formation portion A, FIG. 6 is a cross-sectional view of FIG. 5, taken along the arrow VI—VI, and FIG. 7 is a perspective view of FIG. 5, as looked along the arrow VII. As seen from these figures, the upper board portion 12 of the outer board 11 is provided with a pair of platelike leg pieces 61, 61 on the right and left sides which are moulded integrally therewith, both lateral sections of the cylindrical boss 5 on the right and left sides extending longitudinally being linked integrally with the pair of leg pieces 61, 61, respectively. And a rear end portion 51 of the boss 5 is linked via a leg piece 61 on one side to the platelike rib 7 extending lengthways that is moulded integrally with the upper board portion 12. This rib 7 not only serves to reinforce the upper board portion 12, but also reinforce the boss 5 and the leg pieces 61 supporting the boss 5.

Conventionally, this rib 7 had the same thickness at any position over its entire length, as seen from FIG. 7. Also, an entry corner portion 71 as a link portion of the rib 7 with the rear end portion 51 of the boss 5 had a right angled shape.

By the way, the television cabinet is required to be strong enough to withstand a shock caused by vibrations or impact during the transportation or a stacking load. Therefore, a drop test for the television set employing the cabinet is conducted in accordance with certain standards, in which it is required to increase the reinforcing action with the rib 7 to have a greater strength to withstand this drop test. To cope with this requirement, an attempt was made to increase the thickness of the rib 7.

Figure 8:
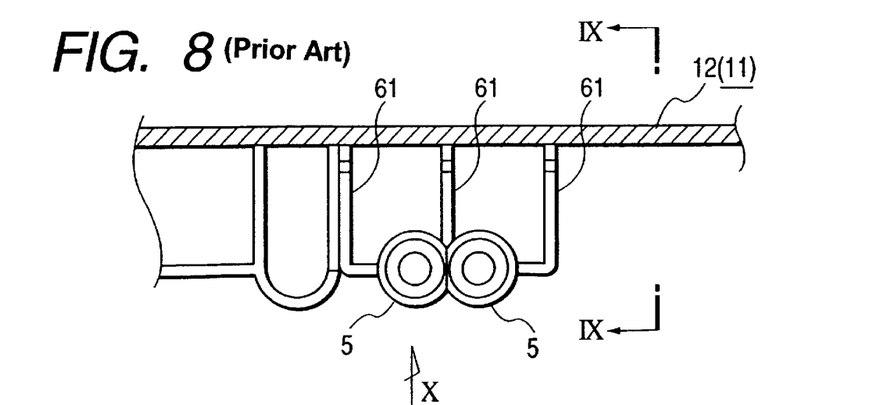
FIG. 8 is a front view of a boss formation portion in a comparative example.
Figure 9:
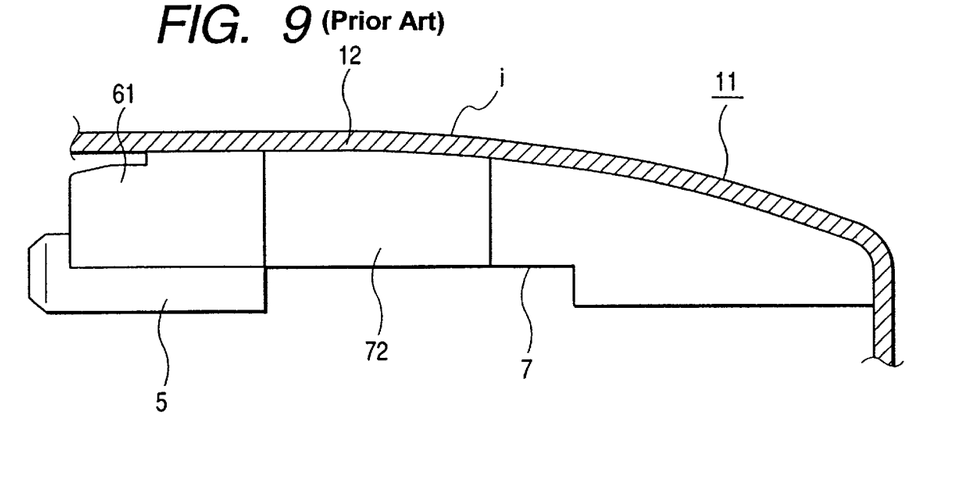
FIG. 9 is a cross-sectional view of FIG. 8, taken along the line IX—IX.
Figure 10:
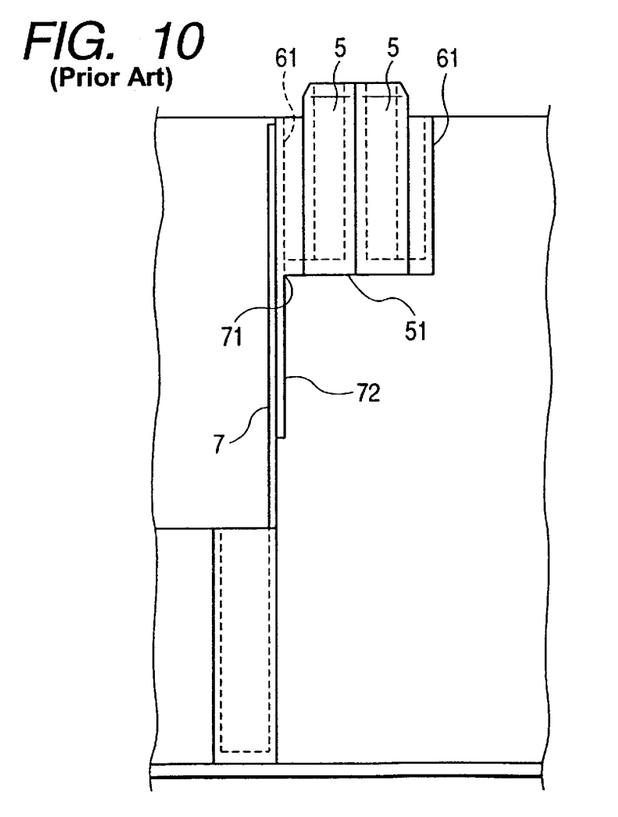
FIG. 10 is a perspective view of FIG. 8, as looked along the arrow X.

FIGS. 8 to 10 show the structure of a boss formation portion A of FIG. 4 made by this attempt. FIG. 8 is a front view of the boss formation portion A, FIG. 9 is a cross-sectional view of FIG. 8, taken along the arrow IX—IX, and FIG. 10 is a perspective view of FIG. 8, taken along the arrow X. As seen from FIGS. 9 and 10, in this attempt, the total height or thickness of the rib 7 was increased in an intermediate portion of the rib 7 extending longitudinally and between the link portions with the leg pieces 61, and a high strength portion 72 was formed by the thickened portion. In this way, the rib 7 having the high strength portion 72 of increased thickness could exhibit a greater strength to withstand a drop test or screwing of an attaching vis into the boss. However, it was found that when the rib 7 was thickened in such a way, a so-called "shrinkage" arose on the surface i (see FIG. 9) of the upper board portion 12 where the high strength portion 72 was formed due to the problems on the moulding techniques, thereby degrading the appearance of the cabinet. Also, it was found that a crack or fissure was likely to occur in the entry corner portion 71 as the link portion of the high strength portion 72 with a rear end portion of the boss 5.

On the other hand, it was considered that a thin rib was provided to each of the right and left leg pieces 61, 61 to increase the reinforcing action. However, it is difficult to provide two ribs in proximity from the respect of moulding techniques, and even if it can be made, there is the disadvantage that the moulding or manufacturing costs may be increased.

Though the boss formation portion A as shown in FIG. 4 is provided with two bosses 5, 5 arranged right and left, this was contrived to employ a spare boss 5 when one boss 5 failed. Accordingly, one boss 5 may be provided in most cases.

On the other hand, there were described some measures for increasing the strength of attaching a cathode ray tube attaching boss into a cathode ray tube as shown in FIG. 4 in the Unexamined Japanese Utility Model Application Publication Nos. Sho62-201583, Sho63-72978, and Sho63-81474.

[Problems that the Invention is to Solve]

As described above and shown in FIGS. 8 to 10, if the conventional television cabinet has simply an increased thickness of the rib 7 to improve the reinforcing action, the "shrinkage" may arise on the surface of the upper outer board 12 on which the rib 7 is provided, degrading the appearance of the cabinet, resulting in the problem that the merchandize quality is lowered. Also, with the techniques as described in the above patents, it is impossible to resolve the insufficient strength of the rib 7 or solve the problem that the "shrinkage" may arise on the surface of the upper outer board 12 on which the rib 7 is provided.

SUMMARY OF THE INVENTION

This invention achieves in the light of the above-mentioned problems or affairs, and it is an object of the invention to provide a television cabinet employing a simple constitution with the increased thickness of the rib 7 to improve the reinforcing action of the rib 7, in which the "shrinkage" may not arise owing to the increased thickness of the rib on the surface of a front cabinet or a rear cabinet on which the rib is provided.

Also, it is another object of this invention to provide a television cabinet in which a crack or fissure is unlikely to occur in the entry corner portion as the link portion of the rib with the rear end portion of the boss.

[Means for Solving the Problem]

A television cabinet of this invention is divided into a front cabinet and a rear cabinet. A platelike rib extending lengthways that is moulded integrally with an outer board of the front cabinet or rear cabinet made of synthetic resin is linked with a rear end portion of a boss for screwing an attaching vis for joining the front cabinet and the rear cabinet. And the rib has a high strength portion of increased thickness extending lengthways to be continuous to the rear end portion of the boss, and a link portion of the rib with the outer board is formed in smaller thickness over an entire length than the high strength portion.

Thereby, the reinforcing action of the rib is increased by the high strength portion of the rib. Nevertheless, the link portion of the rib with the outer board is formed in smaller thickness than the high strength portion, whereby the thickness of the link portion can be set to such an extent that the "shrinkage" may not arise on the surface of the outer board.

In the television cabinet of this invention, it is desirable that the surface of a front end portion of the high strength portion is formed as a concave curved face smoothly continuous to the rear end face of the boss. Thereby, since a stress is more concentrated on an entry corner portion that is the link portion between the rib and the rear end portion, a crack or fissure is less likely to arise at the entry corner portion.

In the television cabinet of this invention, both lateral portions of the boss on the right and left sides may be linked integrally with a pair of platelike leg pieces on the right and left sides that are moulded integrally with the outer board, and the rib may be linked integrally with a leg piece on one side.

Further, it is another object of the invention to provide a television cabinet in which the location of the flexible strip is set in the central section of the ceiling board portion in cross direction, the rib being linked with the flexible strip to reinforce the central section of the ceiling board portion in cross direction, and the flexible strip is omitted from the end portions of the ceiling board portion in cross direction, the boss and the rib for stiffening the boss being only disposed at the end portions in cross direction, whereby the structure of the cabinet is less complex, while the strength of the rib itself for stiffening the boss is not decreased, and there is no risk that the "shrinkage" arises on the outer face of the ceiling board portion due to moulding.

Further, a television cabinet of this invention comprises a front cabinet and a rear cabinet made of synthetic resin, in which a boss for screwing an attaching vis for joining the front cabinet and the rear cabinet is provided on one cabinet of the front cabinet and the rear cabinet, a platelike ceiling board stiffening rib for stiffening a ceiling board portion of one cabinet and a platelike boss stiffening rib for stiffening the boss to be linked with the boss are moulded integrally on an inner face of the ceiling board portion in a form extending lengthways, the boss stiffening rib having a high strength portion of increased thickness extending lengthways, the high strength portion being spaced apart from the inner face of the ceiling board portion, and a link portion of the boss stiffening rib with the ceiling board portion is formed in smaller thickness over an entire length than the high strength portion.

In this television cabinet, the ceiling board stiffening rib serves to stiffen the ceiling board, and the boss stiffening rib serves to stiffen the boss. And the high strength portion of increased thickness provided on the boss stiffening rib not only serves to increase the strength of the boss stiffening rib itself, but also serves to exhibit strikingly the reinforcing action of the boss with the boss stiffening rib. In addition, since the link portion of the boss stiffening rib with the ceiling board portion is formed in smaller thickness than the high strength portion, the thickness of the link portion can be easily set to such an extent that the "shrinkage" may not arise on the surface of the ceiling board portion without decreasing the strength of the boss stiffening rib itself.

In this invention, the ceiling board stiffening rib is disposed in a central section of the ceiling board portion in cross direction, with a flexible strip linked with the ceiling board portion being provided at its end portion, and the boss stiffening rib is disposed at an end portion of the ceiling board portion in cross direction. In this way, it is improved that the central section of the ceiling board portion in cross direction is not reinforced by the rib, whereby the central section of the ceiling board portion in cross direction is reinforced by the ceiling board stiffening rib, and the boss is reinforced by the boss stiffening rib.

Also, in this invention, one longitudinal end of the boss stiffening rib and one longitudinal end of the high strength portion are continuous to a rear wall portion provided at an end portion of the boss in lengthwise direction, and the boss stiffening rib is gradually lower in height when being farther away from the rear wall portion, a top face of the boss stiffening rib at the other end being smoothly continuous to an inner face of the ceiling board portion. In this way, since one longitudinal end of the boss stiffening rib and one longitudinal end of the high strength portion are continuous to the rear wall portion provided at the end portion of the boss in lengthwise direction, a reinforcing action of the boss stiffening rib is directly exerted on the boss, but the reinforcing action of the rib is not indirectly exerted via a crosspiece portion 19 on the boss. Hence, the boss can be effectively reinforced by the boss stiffening rib. In addition, since the boss stiffening rib is gradually lower in height when being farther away from the rear wall portion, and the top face of the boss stiffening rib at the other end is smoothly continuous to the inner face of the ceiling board portion, the boss stiffening rib has a higher strength than where the boss stiffening rib is formed in almost equal thickness over its entire length, which serves to increase the reinforcing action of the ceiling board portion.

In this invention, it is desirable that a peripheral wall of the boss is linked to the top portion of a pair of right and left leg pieces moulded integrally with the ceiling board portion, and one leg piece of the pair of leg pieces and the boss stiffening rib are linked lengthways.

Also, it is desirable that a link portion of the boss stiffening rib with the ceiling board portion has a thickness that is 0.6 times or less that of the ceiling board portion over an entire length. This is because if the thickness of the link portion over the entire length is greater than 0.6 times the thickness of the ceiling board portion, the"shrinkage" arises on the outer face of the ceiling board portion, degrading the appearance, when the ceiling board portion and the boss stiffening rib are moulded integrally of synthetic resin such as polystyrene, while if the thickness of the link portion over the entire length is 0.6 times or less the thickness of the ceiling board portion, no "shrinkage" may arise to degrade the appearance.

In this invention, it is desirable that the interval between the high strength portion of the boss stiffening rib and the inner face of the ceiling board portion is 2 mm or greater. This is because if the interval is shorter than 2 mm, the thickness of a mould for moulding a gap portion between the high strength portion and the inner face of the ceiling board portion is so thin that the mould is difficult to manufacture, and the mould is difficult to release from the gap portion.

In this invention, it is desirable that the surface of the high strength portion of the boss stiffening rib at one longitudinal end is formed as a concave curved face smoothly continuous to the rear wall face of the boss. In this way, since a stress is less concentrated on an entry corner portion as a link portion between the boss stiffening rib and the rear wall face of the boss, a crack or fissure is less likely to occur in the entry corner portion.

More specifically, a television cabinet according to this invention is constituted in the following way. That is, the television cabinet comprises a front cabinet and a rear cabinet made of synthetic resin, in which a boss for screwing an attaching vis for joining the front cabinet and the rear cabinet is provided on one cabinet of the front cabinet and the rear cabinet, a platelike ceiling board stiffening rib for stiffening a ceiling board portion of one cabinet and a platelike boss stiffening rib for stiffening the boss to be linked with the boss are moulded integrally on an inner face of the ceiling board portion in a form extending lengthways, the boss stiffening rib having a high strength portion of increased thickness extending longitudinally, the high strength portion being spaced apart from the inner face of the ceiling board portion, and a link portion of the boss stiffening rib with the ceiling board portion is formed in smaller thickness over an entire length than the high strength portion, wherein the ceiling board stiffening rib is disposed in a central section of the ceiling board portion in cross direction, with a flexible strip linked with the ceiling board portion being provided at its end portion, the boss stiffening rib is disposed at an end portion of the ceiling board portion in cross direction, one longitudinal end of the boss stiffening boss and one longitudinal end of the high strength portion being continuous to a rear wall portion placed at an end portion of the boss in lengthwise direction the surface of the high strength portion at one longitudinal end is formed as a concave curved face smoothly continuous to a rear wall face of the boss, the boss stiffening rib being gradually lower in height when being farther away from the rear wall portion, a top face of the boss stiffening rib at the other end being smoothly continuous to the inner face of the ceiling board portion, a peripheral wall of the boss is linked to a peripheral wall of a spare boss having the same shape as the boss, the peripheral wall of the boss and the peripheral wall of the spare boss being directly linked to a plurality of leg pieces linked on the ceiling board portion, one of the leg pieces and the boss stiffening rib being linked lengthways, the link portion of the boss stiffening rib with the ceiling board portion has a thickness that is 0.6 times or less that of the ceiling board portion over an entire length, and the interval between the high strength portion of the boss stiffening rib and the inner face of the ceiling board portion is 2 mm or greater.

DETAILED DESCRIPTION OF THE PREFERRED EMBODIMENTS

[First Embodiment]

Figure 1:
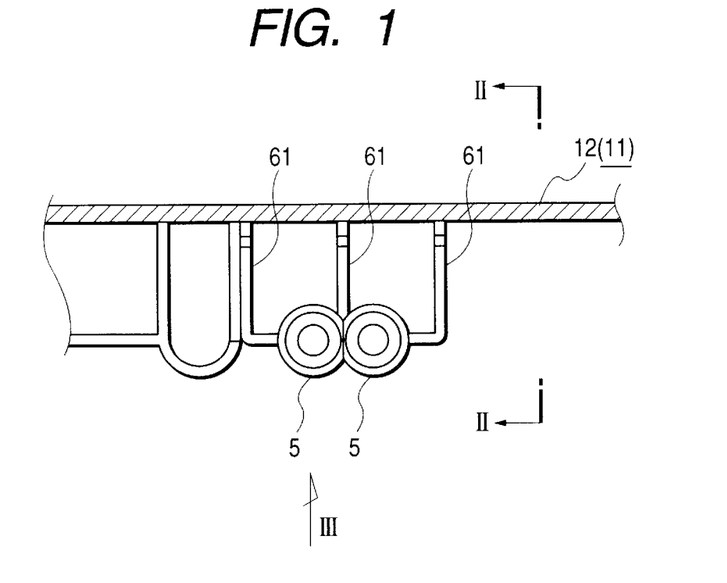
FIG. 1 is a front view of a boss formation portion in a television cabinet according to an embodiment of the present invention.
Figure 2:
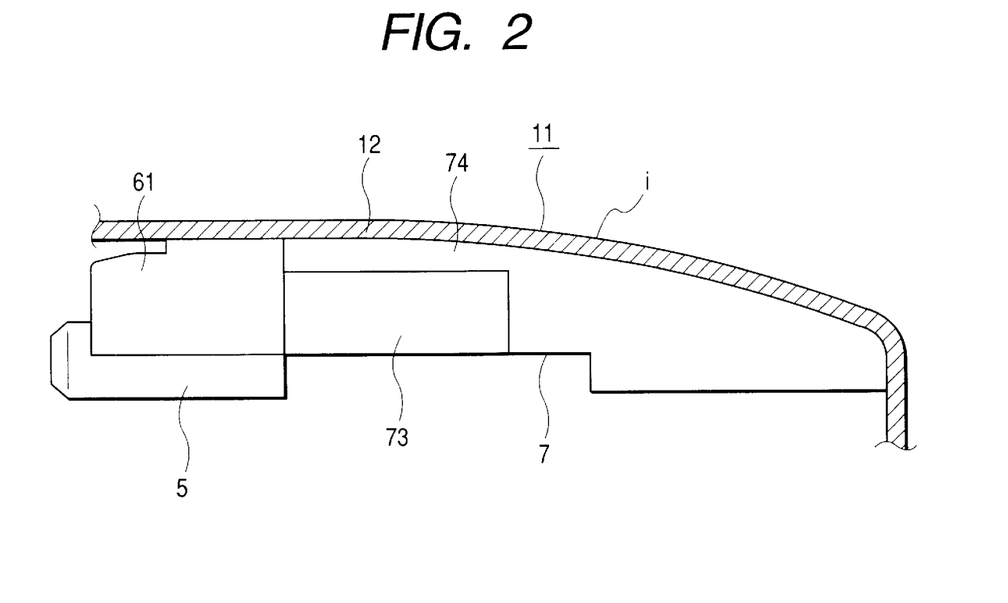
FIG. 2 is a cross-sectional view of FIG. 1, taken along the line II—II.
Figure 3:
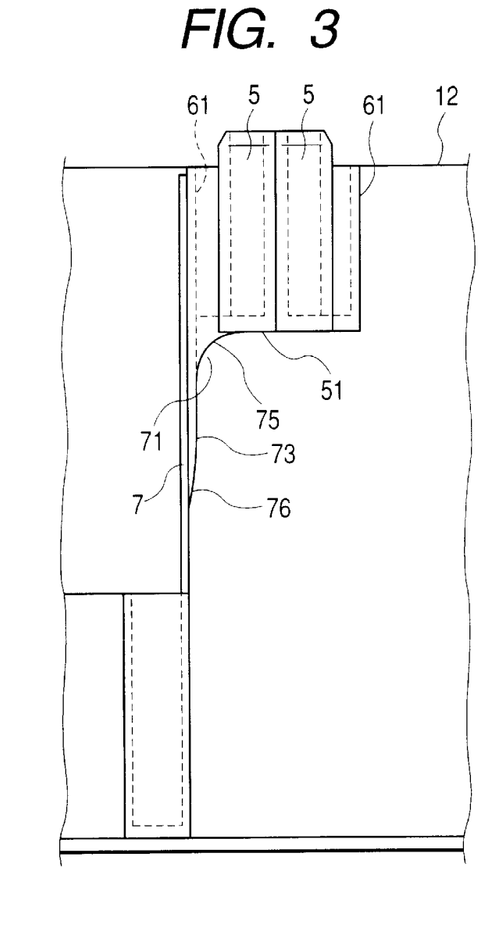
FIG. 3 is a perspective view of FIG. 1, as looked along the arrow III.

FIGS. 1 to 3 show the structure of a boss formation portion A of FIG. 4 in the television cabinet according to the first embodiment of this invention. FIG. 1 is a front view of the boss formation portion A, FIG. 2 is a cross-sectional view of FIG. 1, taken along the line II—II, and FIG. 3 is a perspective view of FIG. 1, taken along the arrow III.

As seen From FIGS. 2 and 3, in this embodiment, the rib 7 has the increased thickness in an intermediate portion of the rib 7 extending longitudinally and between the link portions of the leg pieces 61 with, a high strength portion 73 is formed by its thickened portion. However, this high strength portion 73 is not provided in a root portion of the rib 7 as shown in FIG. 2, in other words, a link portion 74 of the rib 7 with an upper board portion 12. That is, the link portion 74 of the rib 7 has such a thickness that no "shrinkage" arises on the surface of the outer board 12, whereas a portion excluding the link portion 74 forms the high strength portion 73 of increased thickness.

With the cabinet as constructed in the above way, the rib 7 having the high strength portion 73 of increased thickness can exhibit an enough strength to withstand a drop test or screwing of an attaching vis (not shown) into the boss 5.

Also, as seen from FIG. 3, an entry corner portion 71 as a link portion of the high strength portion 73 with a rear end portion 51 of the boss 5 is formed as a concave curved face 75 in which the surface of the high strength portion 73 at the front end portion is smoothly continuous to the rear end portion of the boss 5. In this way, because a stress is less concentrated on the entry corner portion 71, a crack or fissure is less likely to arise at this entry corner portion 71. This action is revealed more strikingly with smaller curvature of the curved face 75. Further, the surface of the high strength portion 73 at the rear end portion is formed as a curved surface 76 smoothly continuous to the surface of the rib 7 in which the surface of the high strength portion 73 is formed in smaller thickness. In, this way, since a stress is less concentrated on a boundary portion between the rear end portion of the high strength portion 73 and the rib 7 formed in smaller thickness, a crack or fissure is unlikely to arise at the boundary portion.

In this embodiment, the rib 7 and the boss 5 are provided in the front cabinet, but the rib and the boss may be provided in the rear cabinet.

The same or like parts are designated by the same numerals throughout the drawings to avoid the duplication of explanation.

[Second Embodiment]

Figure 11:
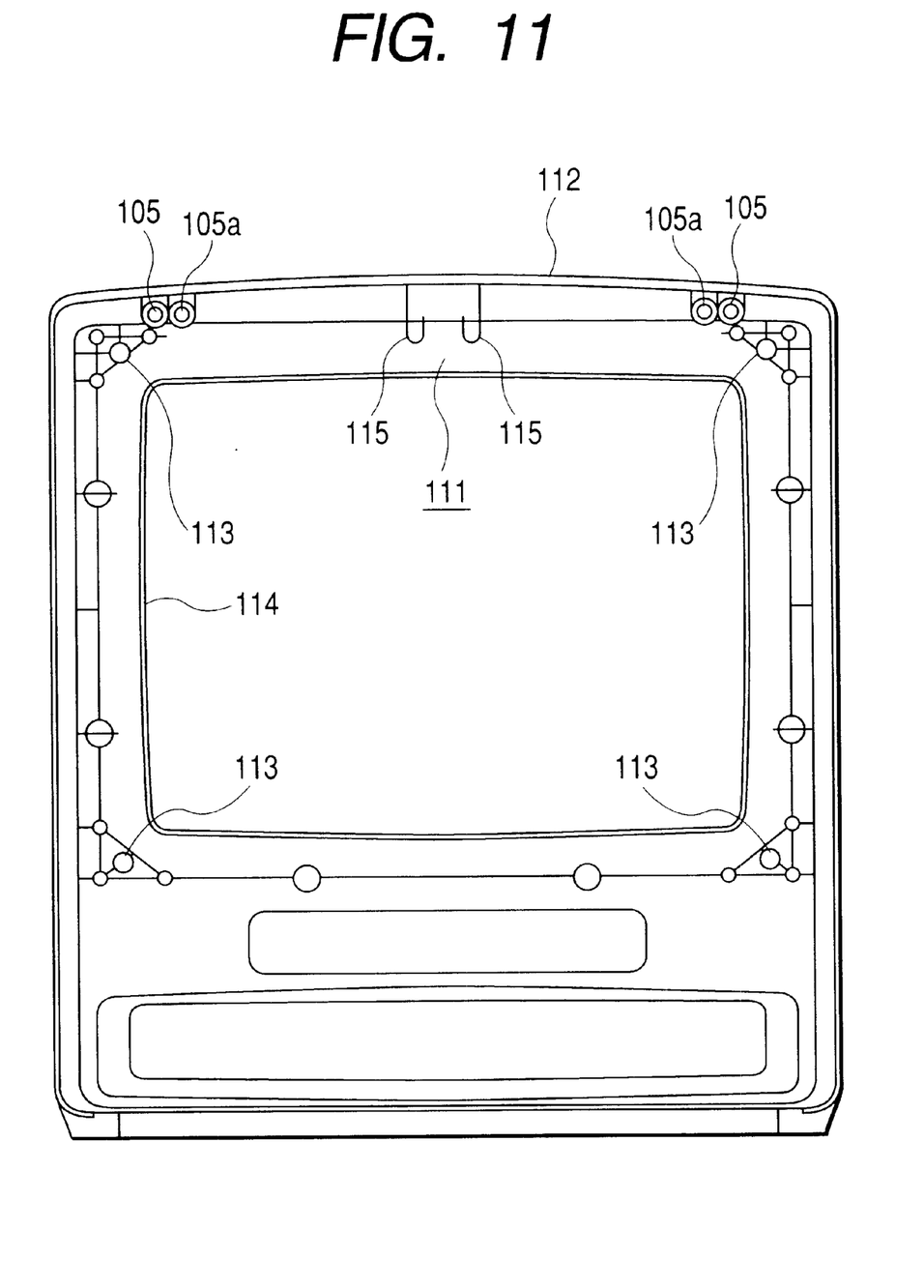
FIG. 11 is a front view of a front cabinet for use with a television cabinet of video integral type according to the second embodiment of the present invention, as looked from the back side.
Figure 12:
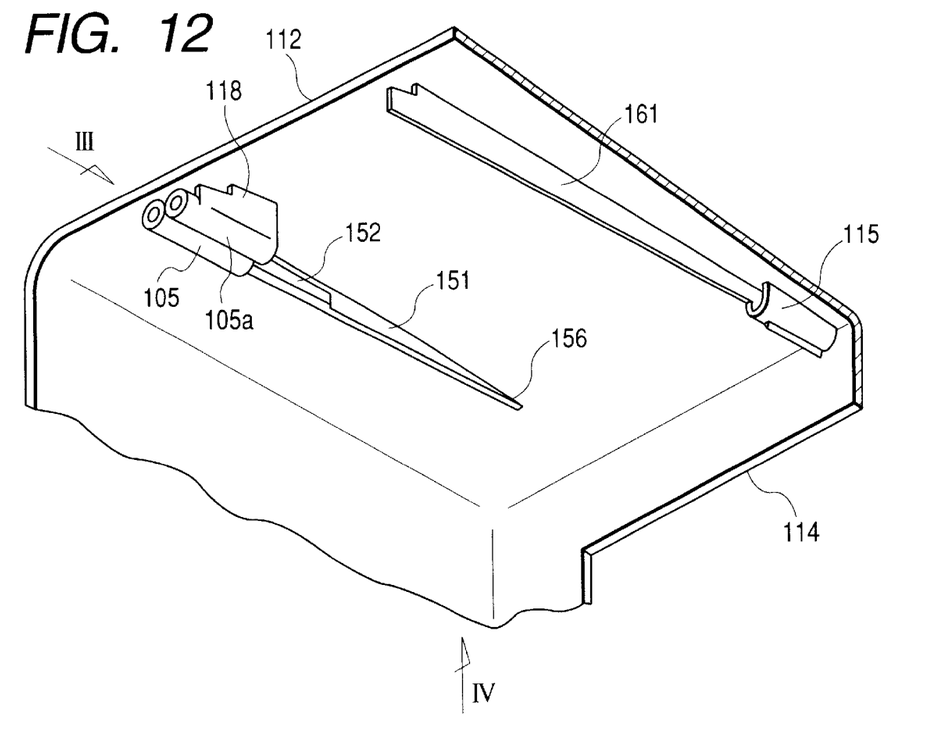
FIG. 12 is a schematic perspective view of the essence of the television cabinet, as looked slantly from the lower side.
Figure 13:
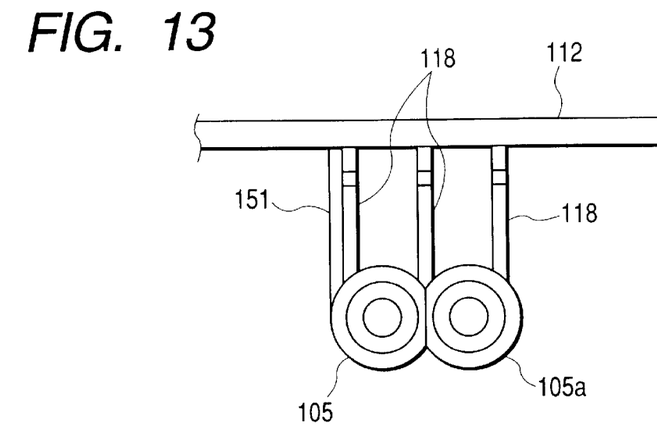
FIG. 13 is a perspective view in enlargement of FIG. 12, as looked along the arrow III.
Figure 14:
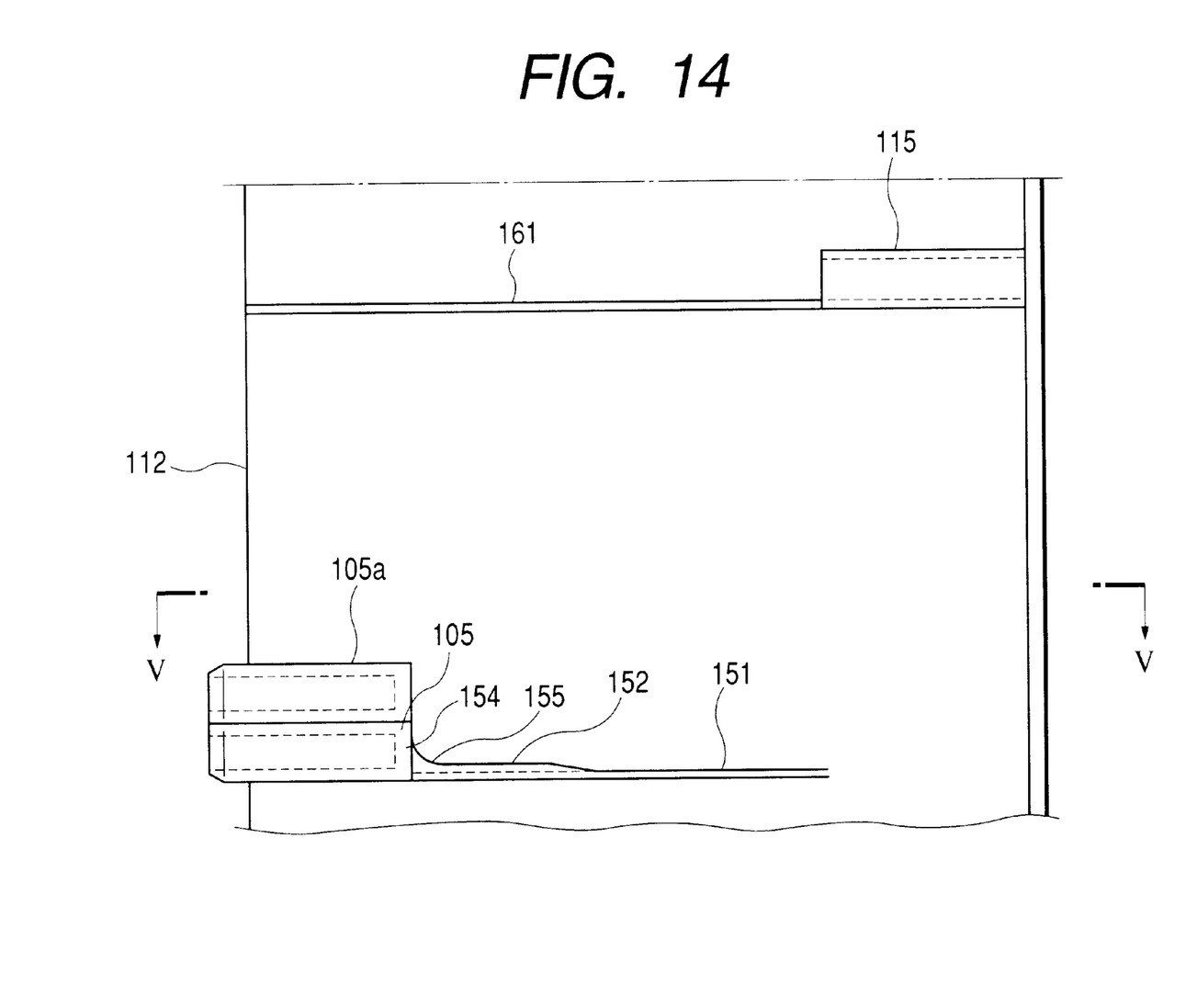
FIG. 14 is a perspective view in enlargement of FIG. 12, as looked along the arrow IV.
Figure 15:
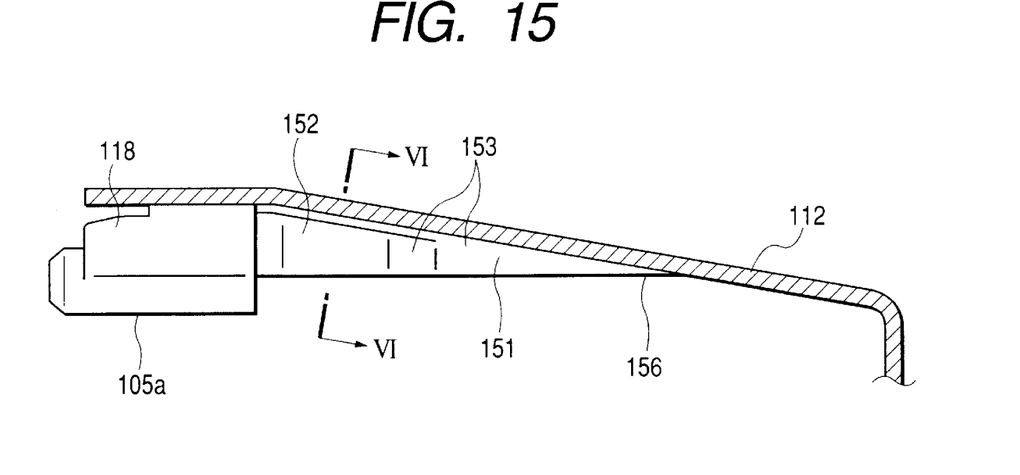
FIG. 15 is a cross-sectional view of FIG. 14, taken along the line V—V.
Figure 16:
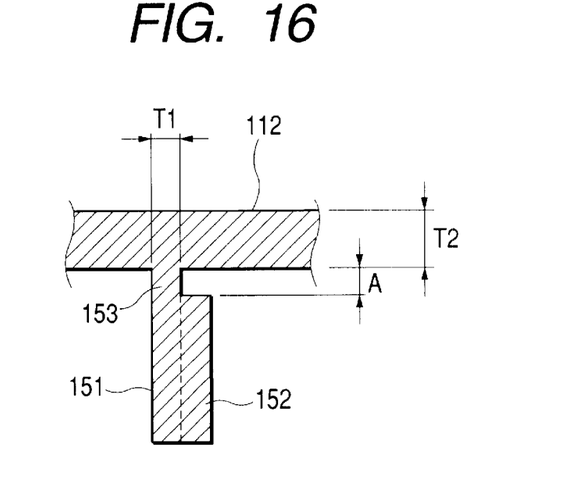
FIG. 16 is a cross-sectional view in enlargement of FIG. 15, taken along the arrow VI—VI.

FIG. 11 is a front view of a front cabinet 110 for use with a television cabinet of video integral type according to the second embodiment of the present invention, as looked from the back side, FIG. 12 is a schematic perspective view of the essence of the television cabinet, as looked slantly from the lower side, FIG. 13 is a perspective view in enlargement of FIG. 12, taken along the arrow III, FIG. 14 is a perspective view in enlargement of FIG. 12, taken along the arrow IV, FIG. 15 is a cross-sectional view of FIG. 14, taken along the line V—V, and FIG. 16 is a cross-sectional view in enlargement of FIG. 15, taken along the line VI—VI.

As shown in FIG. 11, this front cabinet 110 is the same as described in connection with FIG. 17 in which a cylindrical boss 105, a flexible strip 115, and a cathode ray tube attaching boss 113 are provided inside a ceiling board portion 112 of an outer board 111 having an opening 114 where a front face of the cathode ray tube is disposed, except that the boss 105 and the flexible strip 115 is in different positional relation. The flexible strip 105 serves to keep the cathode ray tube from directly abutting against the ceiling board portion 112, when the cathode ray tube is attached into the cathode ray tube attaching boss 113, and serves to relieve an impact when the cathode ray tube abuts against this flexible strip 115.

As seen from FIG. 11, the boss 105 is disposed at an end portion of the ceiling board portion 112 in cross direction, and at its rear end portion, whereas the flexible strip 115 is disposed in a central section of the ceiling board portion 112 in cross direction and at its front end portion.

As shown in FIGS. 12 to 14, a peripheral wall of the boss 105 is linked to a peripheral wall of a spare boss 105a having the same shape as the boss 105, in which the peripheral wall of the boss 105 and the peripheral wall of the spare boss 105a are directly linked to a plurality (three in this example as shown in the figure) of leg pieces 118 linked on the ceiling board portion 112. Also, one leg piece 118 linked with the peripheral wall of the boss 105 is linked with a front end of the platelike boss stiffening rib 151 provided in a form extending longitudinally to an end portion of the ceiling board portion 112 in cross direction. This boss stiffening rib 151 serves to firmly secure the boss 105 or the spare boss 105a supported by the leg piece 118. This boss stiffening rib 151 has a high strength portion 152 of increased thickness extending longitudinally. As shown in FIGS. 15 and 16, the high strength portion 152 is spaced apart from an inner face of the ceiling board portion 112. A link portion 153 of the boss stiffening rib 151 with the ceiling board portion 112 is formed in smaller thickness over its entire length than the high strength portion 152. Further, one (front) end of the boss stiffening boss 151 lengthways and one (front) end of the high strength portion 152 lengthways are continuous to a rear wall portion 154 placed at an end portion (rear end) of the boss in lengthwise direction, a surface of the high strength portion 152 at one end lengthways is formed like a concave curved face 155 smoothly continuous to the rear wall face of the boss 105, whereby a stress is less concentrated on an entry corner portion that is a link portion between the boss stiffening rib 151 and the rear wall face of the boss 105. As will be apparent from FIGS. 12 and 15, the boss stiffening rib 151 is gradually lower in height when being farther away from the rear wall portion 154 of the boss 105, a top face 156 of the boss stiffening rib 105 at the other end being smoothly continuous to an inner face of the ceiling board portion 112.

The boss stiffening rib 151 is gradually lower in height when being closer to the front end, and has a greater stiffness (strength) to strikingly exhibit the reinforcing action of the boss 105. In addition, since the front end of the boss stiffening rib 105 and the front end of the high strength portion 152 are continuous to the rear wall portion of the boss 105 at the rear end, the reinforcing action of the boss stiffening rib 151 is directly exerted on the boss 105, but it does not occur that the reinforcing action of the rib 117 is indirectly exerted via a crosspiece portion 119 on the boss 105. Hence, the boss 105 is stiffened effectively by the boss stiffening rib 105. Further, since a link portion 153 of the boss stiffening rib 151 with the ceiling board portion 112 is formed in smaller thickness than the high strength portion 152, the thickness of the link portion 153 can be easily reduced so that the "shrinkage" may not arise due to moulding on the outer face of the ceiling board portion 112. In this way, owing to the presence of the high strength portion 152, it does not occur that the strength of the boss stiffening rib 151 or the reinforcing action of the boss 105 or the ceiling board portion 112 with the boss stiffening rib 151 is reduced.

Herein, the thickness T1 of the link portion 153 over the entire length as shown in FIG. 16 is desirably 0.6 times or less the thickness T2 of the ceiling board portion 112. This is because if the thickness T1 of the link portion 153 over the entire length is greater than 0.6 times the thickness T2 of the ceiling board portion 112, the "shrinkage" may arise on the outer face of the ceiling board portion 112 to degrade the appearance, when the ceiling board portion 112 and the boss stiffening rib 151 are moulded integrally of synthetic resin such as polystyrene, whereas if the thickness T1 of the link portion 153 over the entire length is 0.6 times or less the thickness T2 of the ceiling board portion 112, it does not occur that "shrinkage" may arise on the outer face of the ceiling board portion 112 to impair the appearance. Specifically, if T2 is equal to 2 mm and T1 is equal to 1.2 mm, no "shrinkage" arises on the outer face of the ceiling board portion 112, and the strength of the link portion 153 can be great enough to satisfy the requirements. Further, the interval A between the high strength portion 152 and the inner face of the ceiling board portion 112 is desirably uniform over its entire length, and specifically 2 mm or less. This is because if the interval A is shorter than 2 mm, the thickness of a mould for moulding a gap portion between the high strength portion 152 and an inner face of the ceiling board portion 112 is so small that the mould is difficult to manufacture, and release from the gap portion.

As shown in FIG. 12 or 14, the flexible strip 115 is linked to a front end of the ceiling board stiffening rib 161 disposed in the central section of the ceiling board portion 112 in cross direction in a form extending longitudinally. Accordingly, the ceiling board portion 112 is stiffened by the ceiling board stiffening rib 161 in the central section in cross direction. Further, when the cathode ray tube is attached, the impact of the cathode ray tube against the ceiling board portion 112 is hampered by the flexible strip 115, and when the cathode ray tube abuts against the flexible strip 115, the impact is absorbed by a flexible deformation of the flexible strip 115.

With the embodiment as described above, the ceiling board stiffening rib 161 serves to stiffen the ceiling board portion 112 in the central section in cross direction. Therefore, it seldom or never occurs that the strength of the ceiling board portion 112 in the central section in cross direction is smaller than at both right and left end portions of the ceiling board portion 112 in cross direction. Nevertheless, since the boss 105 or the boss stiffening rib 151 only exists at an end portion of the ceiling board portion 112 in cross direction, and no flexible strip exists, the structure of the mould for moulding the front cabinet 110 is less complex than the structure of the mould for moulding the conventional front cabinet as described in connection with FIG. 17.

As seen from FIG. 11, the boss 105, the boss stiffening rib 151, the flexible strip 115 and the ceiling board stiffening rib 161 are disposed in bilateral symmetry on the ceiling board portion 112 of the front cabinet 110 that is moulded integrally of synthetic resin such as polystyrene.

In this embodiment, this invention has been applied to the front cabinet, but the invention may be applied to the rear cabinet.

[Effect of the Invention]

As described above, with this invention, though the rib has the increased thickness to improve the reinforcing action with the rib, no "shrinkage" will arise on the surface of the outer board of the front cabinet or rear cabinet due to the increased thickness of the rib. Therefore, it is possible to provide a cabinet in which the outer board or boss can be not only given an enough strength to withstand a drop test or screwing of an attaching screw into the boss, but also the appearance is not impaired by the "shrinkage".

Further, as described above, with this invention, since the ceiling board stiffening rib and the boss stiffening rib are disposed separately in the central section and at the end portion of the ceiling board portion in cross direction, it does not occur that the ceiling board portion has a smaller strength in the central section in cross direction than at the end portion, and the structure of the cabinet is less complex and the manufacturing costs can be suppressed low. Nevertheless, the strength of the boss stiffening rib itself is not decreased, and it is possible to provide a television cabinet without having the risk that the "shrinkage" arises on the outer face due to moulding. Thereby, it is possible to provide the cabinet inexpensively and with excellent durability.

What is claimed is:

1. A television cabinet comprising:
   a front cabinet,
   a rear cabinet, and
   a rib extending lengthways that is molded integrally with an outer board of said front cabinet or said rear cabinet made of synthetic resin, wherein
      said rib is linked with a rear end portion of a boss for joining said front cabinet and said rear cabinet, and has a high strength portion of increased thickness extending lengthways to be continuous to the rear end portion of said boss, said high strength portion being spaced apart from an inner face of said outer board, and
      a link portion of said rib with said outer board is formed in smaller thickness over an entire length than said high strength portion.

2. The television cabinet according to claim 1, wherein a surface of a front end portion of said high strength portion is formed like a concave curved face that is smoothly continuous to a rear end face of said boss.

3. The television cabinet according to claim 1, wherein said boss comprises two lateral portions and wherein a pair of leg pieces molded integrally with said outer board are linked integrally with both lateral portions of said boss, said rib being linked integrally with one of said leg pieces on one side.

4. A television cabinet comprising:
   a front cabinet,
   a rear cabinet made of synthetic resin, in which a boss for joining said front cabinet and said rear cabinet is provided on one cabinet of said front cabinet and said rear cabinet, and
   a ceiling board stiffening rib for stiffening a ceiling board portion of one cabinet and a boss stiffening rib for stiffening the boss to be linked with the boss are molded integrally on an inner face of said ceiling board portion in a form extending lengthways, said boss stiffening rib having a high strength portion of increased thickness extending lengthways, said high strength portion being spaced apart from the inner face of said ceiling board portion, a link portion of said boss stiffening rib with said ceiling board portion being formed in smaller thickness over an entire length than said high strength portion, wherein
      said ceiling board stiffening rib is disposed in a central section of said ceiling board portion in cross direction, with a flexible strip linked with said ceiling board portion being provided at the end portion thereof,
      said boss stiffening rib is disposed at an end portion of said ceiling board portion in cross direction,
      one longitudinal end of said boss stiffening rib and one longitudinal end of said high strength portion is continuous to a rear wall portion provided at an end portion of the boss in lengthwise direction,
      the surface of said high strength portion at one longitudinal end is formed like a concave curved face smoothly continuous to the rear wall portion of the boss,
      said boss stiffening rib is gradually lower in height when being farther away from said rear wall portion, a top face of said boss stiffening rib at the other end being smoothly continuous to an inner face of the ceiling board portion, wherein
         a peripheral wall of the boss is linked to a peripheral wall of a spare boss having the same shape as the boss,
         the peripheral wall of the boss and the peripheral wall of said spare boss are directly linked to a plurality of leg pieces provided on said ceiling board portion,
         one of the leg pieces is linked with said boss stiffening rib lengthways, and wherein
            a link portion of said boss stiffening rib with said ceiling board portion has a thickness that is 0.6 times or less that of said ceiling board portion over an entire length,
            the interval between the high strength portion of said boss stiffening rib and the inner face of said ceiling board portion is 2 mm or greater.

5. A television cabinet comprising:
   a front cabinet,
   a rear cabinet made of synthetic resin, in which a boss for joining said front cabinet and said rear cabinet is provided on one cabinet of said front cabinet and said rear cabinet, and
   a ceiling board stiffening rib for stiffening a ceiling board portion of one cabinet and a boss stiffening rib for stiffening the boss to be linked with the boss are molded integrally on an inner face of said ceiling board portion in a form extending lengthways, said boss stiffening rib having a high strength portion of increased thickness extending longitudinally, said high strength portion being spaced apart from the inner face of said ceiling board portion, and a link portion of said boss stiffening rib with said ceiling board portion is formed in smaller thickness over an entire length than said high strength portion, wherein said ceiling board stiffening rib is disposed in a central section of said ceiling board portion in cross direction, with a flexible strip linked with said ceiling board portion being provided at the end portion thereof, said boss stiffening rib is disposed at an end portion of said ceiling board portion in cross direction, one longitudinal end of said boss stiffening rib and one longitudinal end of said high strength portion is continuous to a rear wall portion placed at an end portion of the boss in lengthwise direction, said boss stiffening rib is gradually lower in height when being farther away from said rear wall portion, and a top face of said boss stiffening rib at the other end is smoothly continuous to the inner face of the ceiling board portion.

6. The television cabinet according to claim 5, wherein the peripheral wall of the boss is directly linked to the top portion of a pair of leg pieces on the right and left sides molded integrally with said ceiling board portion, one leg piece of the pair of leg pieces and said boss stiffening rib are linked lengthways.

7. The television cabinet according to claim 5, wherein the link portion of said boss stiffening rib with said ceiling board portion has a thickness that is 0.6 times or less that of said ceiling board portion over an entire length.

8. The television cabinet according to claim 5, wherein the interval between the high strength portion of said boss stiffening rib and the inner face of said ceiling board portion is 2 mm or greater.

9. The television cabinet according to claim 5, wherein the surface of the high strength portion of said boss stiffening rib at one longitudinal end is formed as the concave curved face smoothly continuous to the rear wall face of the boss.

* * * * *